United States Patent
Salloum et al.

(10) Patent No.: US 12,536,723 B2
(45) Date of Patent: Jan. 27, 2026

(54) SYSTEMS AND METHODS FOR DYNAMIC CONTENT PLACEMENT BASED ON PIXEL COUNT CONFIDENCES IN PRE-EXISTING CONTENT

(71) Applicant: Reinbow LLC, Washington, DC (US)

(72) Inventors: Basem Salloum, Washington, DC (US); Michael Joseph Karlin, Bethesda, MD (US); Roy Feinson, Washington, DC (US)

(73) Assignee: Reinbow LLC, Washington, DC (US)

( * ) Notice: Subject to any disclaimer, the term of this patent is extended or adjusted under 35 U.S.C. 154(b) by 256 days.

(21) Appl. No.: 18/328,710

(22) Filed: Jun. 2, 2023

(65) Prior Publication Data
US 2024/0404143 A1 Dec. 5, 2024

(51) Int. Cl.
*G09G 5/00* (2006.01)
*G06T 11/60* (2006.01)

(52) U.S. Cl.
CPC .................. *G06T 11/60* (2013.01)

(58) Field of Classification Search
CPC ............... G09G 5/14; G09G 2340/10; G09G 2340/125; G06T 11/60; G06T 15/503; G06T 2207/30196; G06T 2207/10016; G06T 7/13; G06T 7/50; G06T 2200/24; G06T 2207/10024; G06T 2207/20221; G06T 11/203; G06T 11/00; G06T 1/60; G06T 7/248; G06T 7/74; G06F 3/017; G06V 20/56; H04N 23/69; G02B 27/001; G02B 2027/0138; G02B 2027/014
USPC .......................................... 345/629
See application file for complete search history.

(56) References Cited

U.S. PATENT DOCUMENTS

| | | | |
|---|---|---|---|
| 9,613,409 B1 * | 4/2017 | Tsai | G09G 3/3406 |
| 2020/0090351 A1 * | 3/2020 | Safdarnejad | G06V 10/757 |
| 2021/0181509 A1 * | 6/2021 | Border | G02B 27/0172 |
| 2022/0272255 A1 * | 8/2022 | Xiong | H04N 23/695 |
| 2022/0301118 A1 * | 9/2022 | Frey | G06T 5/77 |

* cited by examiner

*Primary Examiner* — Gordon G Liu
(74) *Attorney, Agent, or Firm* — Foley & Lardner LLP

(57) ABSTRACT

Systems and methods for dynamic content placement based on pixel count confidences in pre-existing content. For example, the system may receive a first media asset. The system may determine a first pixel count requirement for the first media asset, wherein the first pixel count requirement indicates a required number of pixels appearing in objects for incorporating the first media asset. The system may identify a first object in a second media asset. The system may determine, using an artificial intelligence model, a first pixel count confidence that the first object meets the first pixel count requirement. The system may, in response to determining that the first pixel count confidence corresponds to the threshold pixel count confidence, generate for display, in a user interface, the first media asset at the first object while the second media asset is presented.

20 Claims, 5 Drawing Sheets

300

350

SYSTEMS AND METHODS FOR DYNAMIC CONTENT PLACEMENT BASED ON PIXEL COUNT CONFIDENCES IN PRE-EXISTING CONTENT

BACKGROUND

Users are exponentially consuming digital content such as streaming media, websites, mobile apps, and/or social media platforms. In conjunction with this consumption, content providers are increasingly attempting to pair other content (e.g., advertisements) with this digital content. In some instances, this other content may comprise pre-roll, mid-roll, and/or post-roll content within videos that users are consuming. In other instances, this content may comprise native content that is matched to the format and/or style of text of a platform. In yet a newer iteration, content providers may partner with content creators (e.g., "influencers") to promote products or services to their audience through sponsored posts or videos.

However, each of these mechanisms for pairing content suffers from a fundamental flaw: the content to be paired must be selected and integrated prior to content creation (e.g., as in a sponsored post) or requires reserving a portion of the content that may be populated by other content later (e.g., as in pre-roll, mid-roll, and/or post-roll content). None of these solutions are thus able to dynamically place content (e.g., place content in real or near real time) in pre-existing content without relying on a previous allocation by the original content.

SUMMARY

Accordingly, systems and methods are described herein for dynamically placing content in pre-existing content. For example, the systems and methods may receive a first media asset (e.g., an advertisement) and seamlessly insert the first media asset into an object found in a second media asset (e.g., a video currently being displayed).

To achieve this technical benefit, the systems and methods overcome several technical challenges. First, the systems and methods identify (e.g., in real time) an object in the second media asset. Second, the systems and methods determine whether that object is suitable for housing the first media asset. However, determining the suitability of an object in a media asset (e.g., in real time) presents its own technical challenges. For example, the object needs to have an appropriate size (e.g., in order to clearly present the first media asset). The object also needs to remain present in the second media asset for a threshold amount of time (e.g., in order to devote enough screentime to the first media asset). Finally, any suitable object that is both suitable in size and screen presence likely changes its position, orientation, and/or proportion to other objects in the second media asset as the second media asset is played back. In order to provide a seamless insertion of the first media asset onto the object in the second media asset, the system may need to account for the changes of the object.

To further exacerbate these technical problems, the system may not have access to the second media asset prior to its display. Thus, the system may not have prior knowledge of the objects in the second media asset, their suitability for use to place a first media asset, and/or any changes occurring to those objects in the second media asset. To overcome these technical problems, the systems and methods use an artificial intelligence model to determine a pixel count confidence that an object in the second media asset meets a pixel count requirement (e.g., indicating a required number of pixels appearing in objects in the second media asset for incorporating the first media asset). For example, the system may detect an object and use an artificial intelligence model (e.g., trained on similar objects, media assets, etc.) to determine a likelihood that that object will be suitable for placing the object. The system then compares this likelihood to a threshold likelihood (e.g., a threshold pixel count confidence) to determine whether to place the first media asset at the object.

In some aspects, systems and methods for dynamic content placement based on pixel count confidences in pre-existing content are described. For example, the system may receive a first media asset. The system may determine a first pixel count requirement for the first media asset, wherein the first pixel count requirement indicates a required number of pixels appearing in objects for incorporating the first media asset. The system may identify a first object in a second media asset. The system may determine, using an artificial intelligence model, a first pixel count confidence that the first object meets the first pixel count requirement. The system may determine whether the first pixel count confidence corresponds to a threshold pixel count confidence. The system may, in response to determining that the first pixel count confidence corresponds to the threshold pixel count confidence, generate for display, in a user interface, the first media asset at the first object while the second media asset is presented.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

Figure 1:
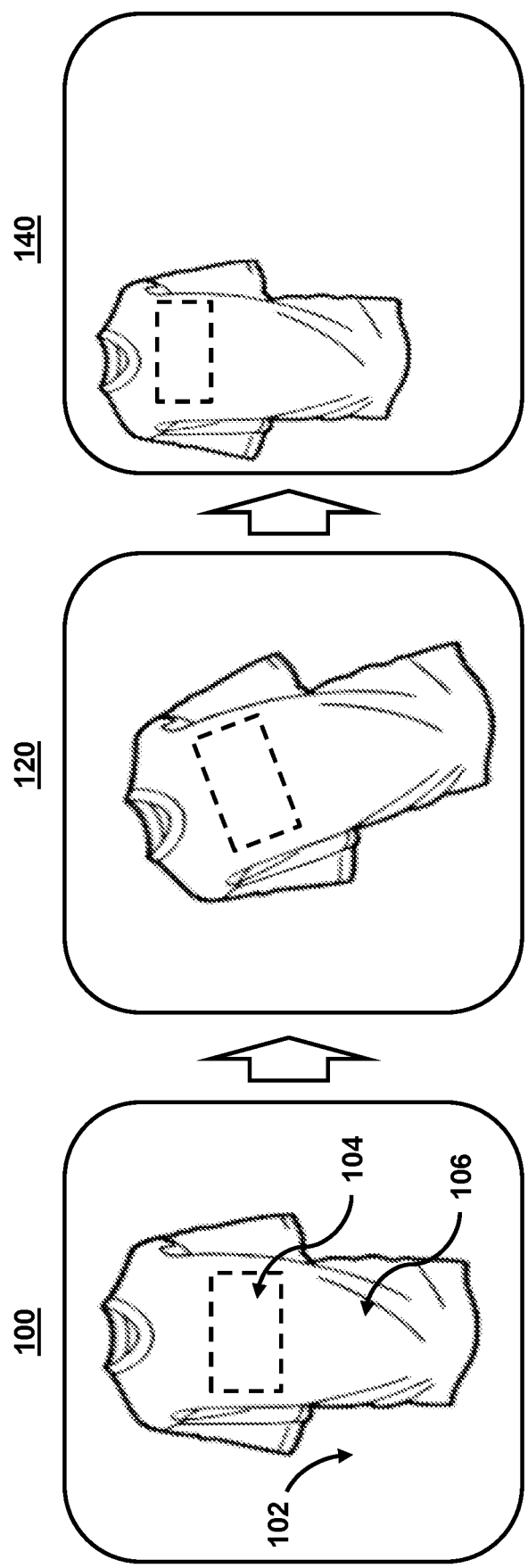
FIG. 1 shows an illustrative example of dynamic content placement, in accordance with one or more embodiments.

FIG. 1 shows an illustrative example of dynamic content placement, in accordance with one or more embodiments. For example, FIG. 1 shows user interface 100, user interface 120, and user interface 140. As referred to herein, a "user interface" may comprise a human-computer interaction and communication in a device, and may include display screens, keyboards, a mouse, and the appearance of a desktop. For example, a user interface may comprise a way a user interacts with an application or a website.

User interface 100, user interface 120, and user interface 140 include media asset 102 and media asset 104. As referred to herein, "a media asset" should be understood to mean an electronically consumable content, such as internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. A media asset may be recorded, played, displayed, or accessed by user devices, but can also be part of a live performance or other user-generated content. Furthermore, user-generated content may include content created and/or consumed by a user. For example, user-generated content may include content created by another but consumed and/or published by the user.

User interface 100, user interface 120, and user interface 140 also include object 106. As referred to herein, "an object" may refer to a discrete element or entity that exists within the digital environment of a media asset. It can represent various components such as images, videos, audio files, text, 3D models, animations, and/or interactive elements. For example, objects may represent the building blocks used to create media assets. In some embodiments, objects may be treated as individual entities with specific properties, behaviors, and/or characteristics. The objects can be manipulated, arranged, and/or interacted with by users or software applications. For example, the objects may be presented, created, resized, rotated, and/or layered to compose a media asset.

In some embodiments, an object may be a foreground object. A foreground object may refer to elements or subjects that are prominently featured and/or visually stand out in a scene or composition of a media asset. They may be positioned in the front or closer to the viewer compared to other elements in the background or middle ground. In some embodiments, the foreground objects may play a significant role in directing the viewer's attention and creating depth within the visual frame. They may serve to anchor the composition and establish a focal point. By being positioned closer to the viewer, they tend to appear larger and more detailed, drawing the viewer's eye and creating a sense of immediacy.

Foreground objects may be contrasted with background objects, or simply the background, of a media asset. A background may refer to the visual or auditory elements that appear behind the main subject or action in a particular scene or shot (e.g., the foreground object). It may set the stage and provide context for the primary content being presented. The background in media can vary depending on the medium, such as film, television, photography, or digital media.

As shown in FIG. 1, media asset 102 may proceed through a series of instances or frames as shown in user interface 100, user interface 120, and user interface 140. For example, each of user interface 100, user interface 120, and user interface 140 may refer to a frame of a video. A frame may refer to a single still image in a sequence of images that make up a video, animation, and/or other media asset. In some embodiments, a frame may comprise the basic unit of time and visual information in a video, animation, and/or other media asset. For example, each frame may contain visual data that represents a specific moment in time. The frame may comprise pixels arranged in a grid pattern, where each pixel contains color and brightness information. When frames are displayed in quick succession, the human eye perceives them as a fluid motion, giving the impression of a moving image.

A pixel may comprise the smallest unit of a digital image, display, and/or other component of a media asset. A pixel may comprise a square or dot that represents a single point of color on a screen. Pixels may be arranged in a grid pattern, and each pixel can be assigned a specific color and brightness level, which collectively creates the visual information that forms an image. In displays such as computer monitors, televisions, or mobile screens, pixels work together to form the entire image by combining different colors and intensities. When viewed from a distance, the individual pixels blend together to create the illusion of continuous shapes and colors.

In some embodiments, the system may count pixels appearing in a media asset and/or one or more frames and/or objects in a media asset. To count the number of pixels, the system may rely on information provided by a display hardware and/or an operating system. For example, the display hardware, such as the graphics card or integrated graphics processor (GPU), may be responsible for driving the screen and/or rendering a media asset. The display may comprise the grid of pixels. Each display may have a specific resolution, which refers to the number of pixels horizontally and vertically on the screen. For example, a common resolution is 1920×1080, which means there are 1920 pixels in width and 1080 pixels in height. The system may determine the number of pixels and/or proportion of pixels of an object to other pixels based on the resolution.

In some embodiments, the operating system may interact with the display hardware to retrieve information about the screen's resolution and other display properties. The operating system may provide software libraries or APIs (Application Programming Interfaces) that allow applications and software programs to interact with the display. These libraries may have functions or methods that provide information about the screen, including its resolution, object location, and/or pixel counts. The system may use a program or application to query the screen resolution, object location, and/or pixel counts.

As shown in FIG. 1, object 106 may vary its size, position, orientation, and/or other characteristics during the presentation of media asset 102. The system may monitor its size, position, orientation, and/or other characteristics based on pixel locations. For example, the system may detect pixels corresponding to an object (and/or pixels likely to correspond to pixels of the object) and determine the location of the pixels. To determine the location of a pixel in a frame, the system may use a coordinate system based on the dimensions of the frame (e.g., whether two-dimensional, three-dimensional, virtual reality, etc.). For example, in two dimensions, the system may represent the pixel's location using two values: the horizontal position (X-coordinate) and the vertical position (Y-coordinate). The system may determine the width (number of columns) and height (number of rows) of the frame to establish a valid range for X and Y coordinates. The system may then convert them to X and Y coordinates. Assuming (0,0) represents the top-left corner of the frame, the system may determine that the X-coordinate corresponds to the column index, and the Y-coordinate corresponds to the row index.

Based on the position of object 106, the system may generate an additional media asset (e.g., an advertisement, logo, etc.) at the position of object 106. In some embodiments, the system may generate for display the first media asset (e.g., comprising an advertisement) in an object of a second media asset. For example, the system may generate the first media asset over several frames (either consecutive or non-consecutive). To do so, the system may determine a location of an object in each frame of the media asset. The system may then overlay (or replace) the object with the first media asset at each respective location in each respective frame. For example, to overlay a media asset on the object, the system may edit the object (and/or the second media asset). In some embodiments, the system may create a new layer in the second media asset. Layers are used to stack different elements in an image, video, and/or other content. The system may create a new layer that will contain the first media asset and overlay this new layer over a layer comprising the second media asset and/or object. In some embodiments, the system may position, and/or resize other property of the first media asset and/or object. For example, when generating for display the first media asset at the first object while the second media asset is presented, the system may determine a first location of the first object in a first frame of the second media asset. The system may generate for display the first media asset at the first location in the first frame of the second media asset. The system may determine a second location of the first object in a second frame of the second media asset. The system may generate for display the first media asset at the second location in the second frame of the second media asset.

In some embodiments, the system may generate for display the first media asset (e.g., comprising an advertisement) with the same orientation as the object in the second media asset. For example, the object may change orientations in the second media asset as the second media asset is displayed. In order to maintain continuity, the system may adjust the orientation of the first media asset in response. For example, when generating for display the first media asset at the first object while the second media asset is presented, the system may determine a first orientation of the first object (e.g., based on detecting object and pixel locations) in a first frame of the second media asset. The system may generate for display the first media asset with the first orientation in the first frame of the second media asset. The system may determine a second orientation of the first object in a second frame of the second media asset. The system may generate for display the first media asset with the second orientation in the second frame of the second media asset.

In some embodiments, the system may generate for display a selectable first media asset. For example, the system may generate a hyperlink that may be selected by a user while the first media asset is displayed. For example, when generating for display the first media asset at the first object while the second media asset is presented, the system may determine a first link for the first media asset. The system may embed the first link in the first media asset.

Figure 2:
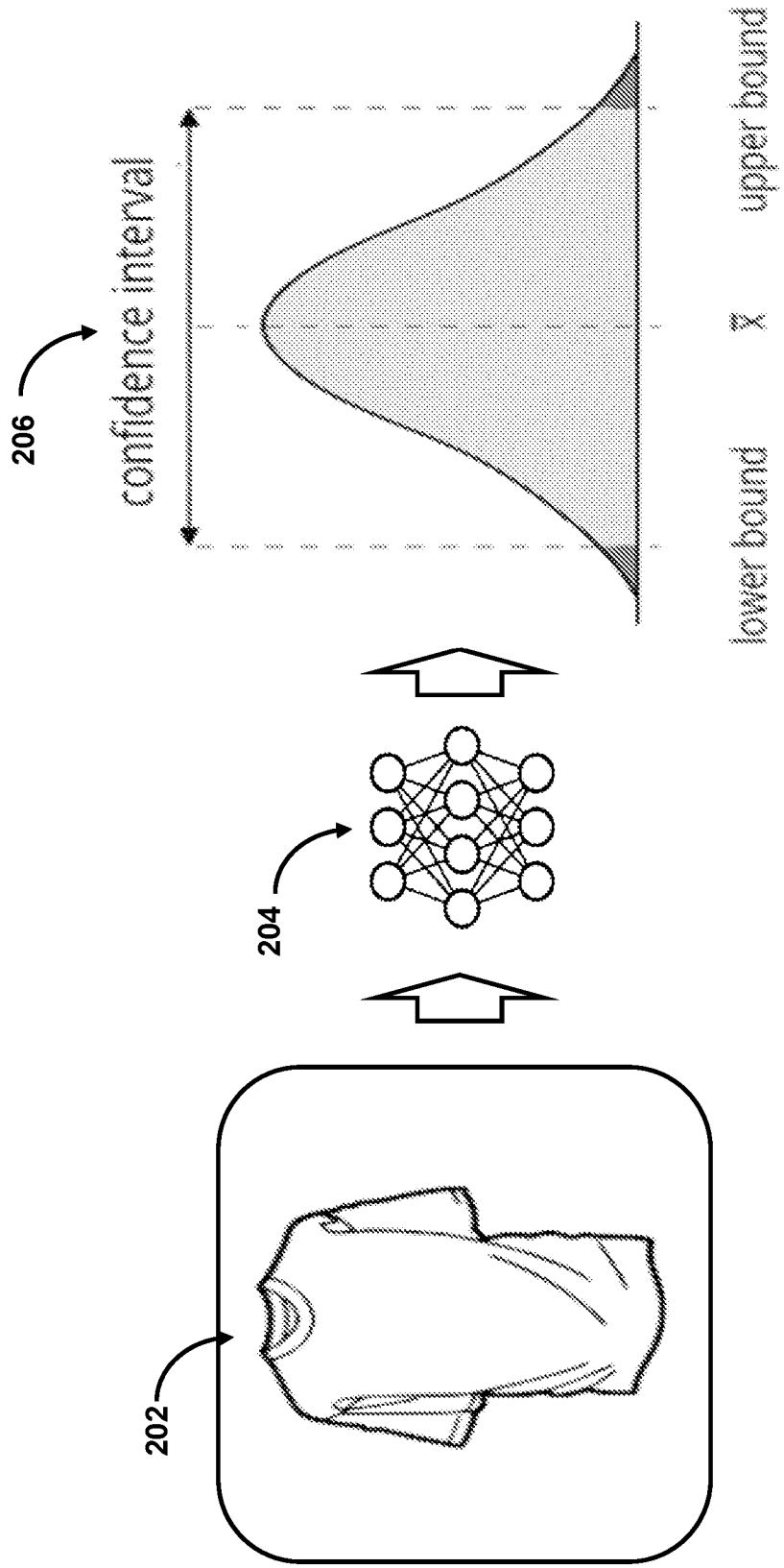
FIG. 2 shows an illustrative example determining a confidence level for dynamic content placement, in accordance with one or more embodiments.

FIG. 2 shows an illustrative example determining a confidence level for dynamic content placement, in accordance with one or more embodiments. For example, in some embodiments, the system may not have access to a second media asset (e.g., media asset 102 (FIG. 1)) prior to its display. Thus, the system may not have prior knowledge of the objects (e.g., object 106 (FIG. 1)) in the second media asset, their suitability for use to place a first media asset, and/or any changes occurring to those objects in the second media asset. The system may use an artificial intelligence model to determine a pixel count confidence that an object in the second media asset meets a pixel count requirement (e.g., indicating a required number of pixels appearing in objects in the second media asset for incorporating the first media asset). For example, the system may detect an object and use an artificial intelligence model (e.g., trained on similar objects, media assets, etc.) to determine a likelihood that that object will be suitable for placing the object. The system then compares this likelihood to a threshold likelihood (e.g., a threshold pixel count confidence) to determine whether to place the first media asset at the object.

As shown in FIG. 2, the system may receive a media asset (e.g., media asset 202 (FIG. 2)). In some embodiments, the media asset may be accompanied by and/or associated with metadata. Metadata refers to data that provides information about other data. In some embodiments, the system may receive metadata that describe the content and/or context of the media asset (e.g., the type of media asset and/or type of media asset to be inserted), a pixel count requirement for a media asset, and/or information about objects in the media asset. For example, the purpose of the metadata may be to provide context, description, and/or organization to the media asset it represents. For example, the metadata may describe and identify various aspects of data, such as the title, author, date created, file format, and/or size. That is, it may provide essential information about the content and characteristics of the data.

The system may then determine a pixel count confidence for the media asset and/or an object therein. For example, the system may determine, using an artificial intelligence model, a first pixel count confidence that the first object meets a first pixel count requirement. In some embodiments, the system may use an artificial intelligence model to estimate a confidence at which a number of pixels in the object corresponds to the pixel count requirement. For example, as the system is generating and placing content in pre-existing content, the system may need to estimate the likelihood that a given object is going to remain displayed and/or be large enough to adequately display an advertisement.

The system may determine whether or not the object is likely to be displayed for a sufficient amount of time (e.g., in a threshold number of frames in the media asset), is going to be displayed prominently in the media asset (e.g., corresponds to a high proportion of pixels in a given frame), and/or whether it will display on an object that does not change orientation (e.g., via a character moving, twisting, etc.) to an extent that the advertisement is obscured. As shown in FIG. 2, the system may select model 204 from a plurality of artificial intelligence models (e.g., the plurality of artificial intelligence models described in FIG. 3). Model 204 may use Bayesian classifiers, decision tree learners, decision rule classifiers, neural networks, and/or nearest neighbor algorithms. The system may generate a feature input with a format and/or values that are normalized based on the model into which the feature input is to be input. For example, in some embodiments, the system may use a latent representation (e.g., as described in FIG. 3), in which a lower dimensional representation of data may be used.

The system may then input the feature input into model 204. For example, the system may input a feature input into the artificial intelligence model. For example, the system may determine a pixel count confidence by generating a first feature input for model 204 and inputting the input into model 204. The system may receive an output from model 204. For example, the output may indicate pixel count confidence 206.

In some embodiments, the system may compare the pixel count confidence to a threshold confidence to determine whether to place the first media asset in the second media asset. The system may then determine the pixel count confidence. For example, the system may determine whether the pixel count confidence corresponds to a given confidence level, which may involve examining the confidence interval or p-value obtained from the statistical analysis. For example, the confidence interval may provide a range of values within which the true population parameter is likely to fall, while a p-value indicates the likelihood of obtaining the observed results if the null hypothesis is true. For example, the media asset to be placed (e.g., an advertisement) may have one or more thresholds for display that must be met in order to place the media asset. In some embodiments, the system may determine these thresholds based on metadata received with and/or metadata otherwise associated with the media asset. For example, when determining whether the first pixel count confidence corresponds to the threshold pixel count confidence, the system may receive metadata for the first media asset. The system may then determine the threshold pixel count confidence based on the metadata.

Pixel count confidence 206 may represent a confidence interval that provides an estimate of the range within which a population parameter (e.g., a required number of pixels appearing in objects for incorporating a media asset) is likely to fall. As shown in FIG. 2, the bounds of a confidence interval may be expressed as an upper bound and a lower bound. The system may determine specific values for the upper and lower bounds based on the level of confidence chosen for the interval. In some embodiments, the system may determine a sample mean, a sample standard deviation (or another measure of variability), a sample size, and/or a desired level of confidence.

Figure 3:
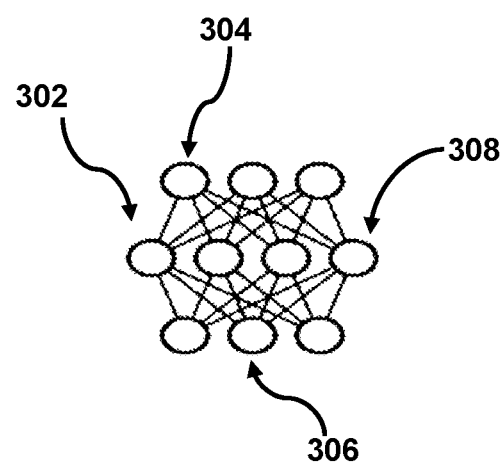
FIG. 3 shows an artificial intelligence architecture for dynamic content placement, in accordance with one or more embodiments.
Figure 3:
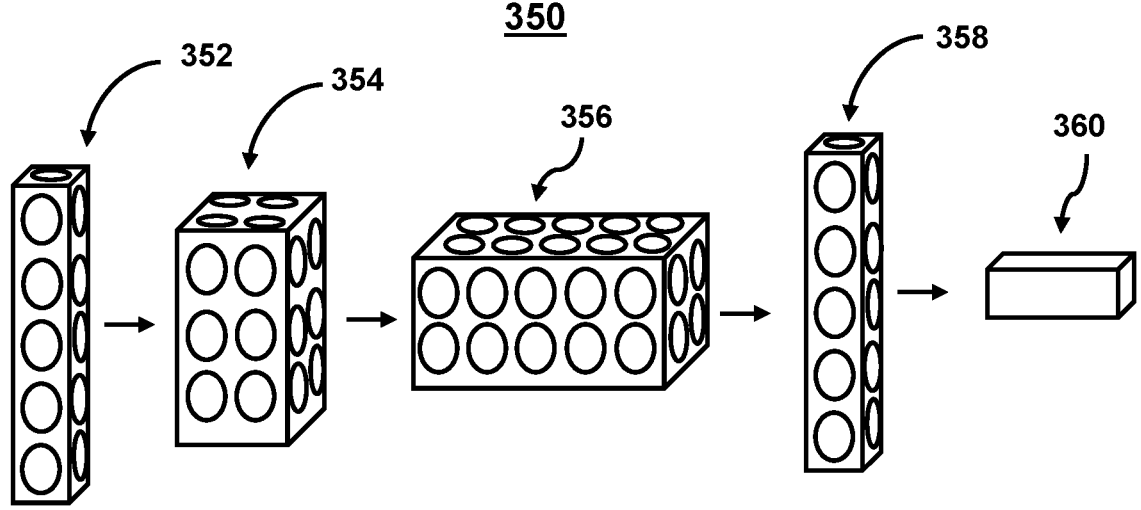

FIG. 3 shows an artificial intelligence architecture for dynamic content placement, in accordance with one or more embodiments. For example, the system may include one or more artificial intelligence models, architectures, and/or data preparation steps to dynamically place content. The system may determine which artificial intelligence model to use for one or more determinations (e.g., identifying content, identifying media assets, placing media assets on objects, modifying media assets to mimic objects in media assets, determining confidences, etc.) used to generate determinations and/or generate metadata herein. For example, the system may determine, using an artificial intelligence model, a first pixel count confidence that the first object meets the first pixel count requirement. The system may determine whether the first pixel count confidence corresponds to a threshold pixel count confidence. The system may, in response to determining that the first pixel count confidence corresponds to the threshold pixel count confidence, generate for display, in a user interface, the first media asset at the first object while the second media asset is presented. The system may select the artificial intelligence model (e.g., from the plurality of artificial intelligence models) that is best suited for providing the most accurate result. For example, the system may select from various ensemble architectures featuring one or more models that are trained (e.g., in parallel) to provide the most accurate result.

Model 300 illustrates an artificial neural network. Model 300 includes input level 302. Input level 302 may receive data related to content, media assets, objects, modifying media assets to objects' movements in media assets, confidences, etc. Model 300 also includes one or more hidden layers (e.g., hidden layer 304 and hidden layer 306). Model 300 may be based on a large collection of neural units (or artificial neurons). Model 300 loosely mimics the manner in which a biological brain works (e.g., via large clusters of biological neurons connected by axons). Each neural unit of a model 300 may be connected with many other neural units of model 300. Such connections can be enforcing or inhibitory in their effect on the activation state of connected neural units. In some embodiments, each individual neural unit may have a summation function which combines the values of all of its inputs together. In some embodiments, each connection (or the neural unit itself) may have a threshold function such that the signal must surpass before it propagates to other neural units. Model 300 may be self-learning and trained, rather than explicitly programmed, and can perform significantly better in certain areas of problem solving, as compared to traditional computer programs. During training, output layer 308 may correspond to a classification of model 300 (e.g., content, media assets, placements of media assets on objects, modification of media assets to mimic objects in media assets, confidences, etc.) and an input known to correspond to that classification may be input into input level 302. In some embodiments, model 300 may include multiple layers (e.g., where a signal path traverses from front layers to back layers). In some embodiments, back propagation techniques may be utilized by model 300 where forward stimulation is used to reset weights on the "front" neural units. In some embodiments, stimulation and inhibition for model 300 may be more free-flowing, with connections interacting in a more chaotic and complex fashion. Model 300 also includes output layer 308. During testing, output layer 308 may indicate whether or not a given input corresponds to a classification of model 300 (e.g., identifying content, identifying media assets, placing media assets on objects, modifying media assets to mimic objects in media assets, determining confidences, etc.).

FIG. 3 also includes model 350, which is a convolutional neural network. The convolutional neural network is an artificial neural network that features one or more convolutional layers. Convolution layers extract features from an input. Convolution preserves the relationship between the inputted data by learning features using partitions of the input data. As shown in model 350, input layer 352 may proceed to convolution blocks 354 and 356 before being output to convolutional output 360. In some embodiments, model 350 may itself serve as an input to model 300. For example, the system may determine, using model 350, a first pixel count confidence that the first object meets the first pixel count requirement. The system may determine whether the first pixel count confidence corresponds to a threshold pixel count confidence. The system may, in response to determining that the first pixel count confidence corresponds to the threshold pixel count confidence, generate for display, in a user interface, the first media asset at the first object while the second media asset is presented.

In some embodiments, model 350 may implement an inverted residual structure where the input and output of a residual block (e.g., block 354) are thin bottleneck layers. A residual layer may feed into the next layer and directly into layers that are one or more layers downstream. A bottleneck layer (e.g., block 358) is a layer that contains few neural units compared to the previous layers. Model 350 may use a bottleneck layer to obtain a representation of the input with reduced dimensionality. An example of this is the use of autoencoders with bottleneck layers for nonlinear dimensionality reduction. Additionally, model 350 may remove non-linearities in a narrow layer (e.g., block 358) in order to maintain representational power. In some embodiments, the design of model 350 may also be guided by the metric of computation complexity (e.g., the number of floating point operations). In some embodiments, model 350 may increase the feature map dimension at all units to involve as many locations as possible instead of sharply increasing the feature map dimensions at neural units that perform downsampling. In some embodiments, model 350 may decrease the depth and increase width of residual layers in the downstream direction.

Figure 4:
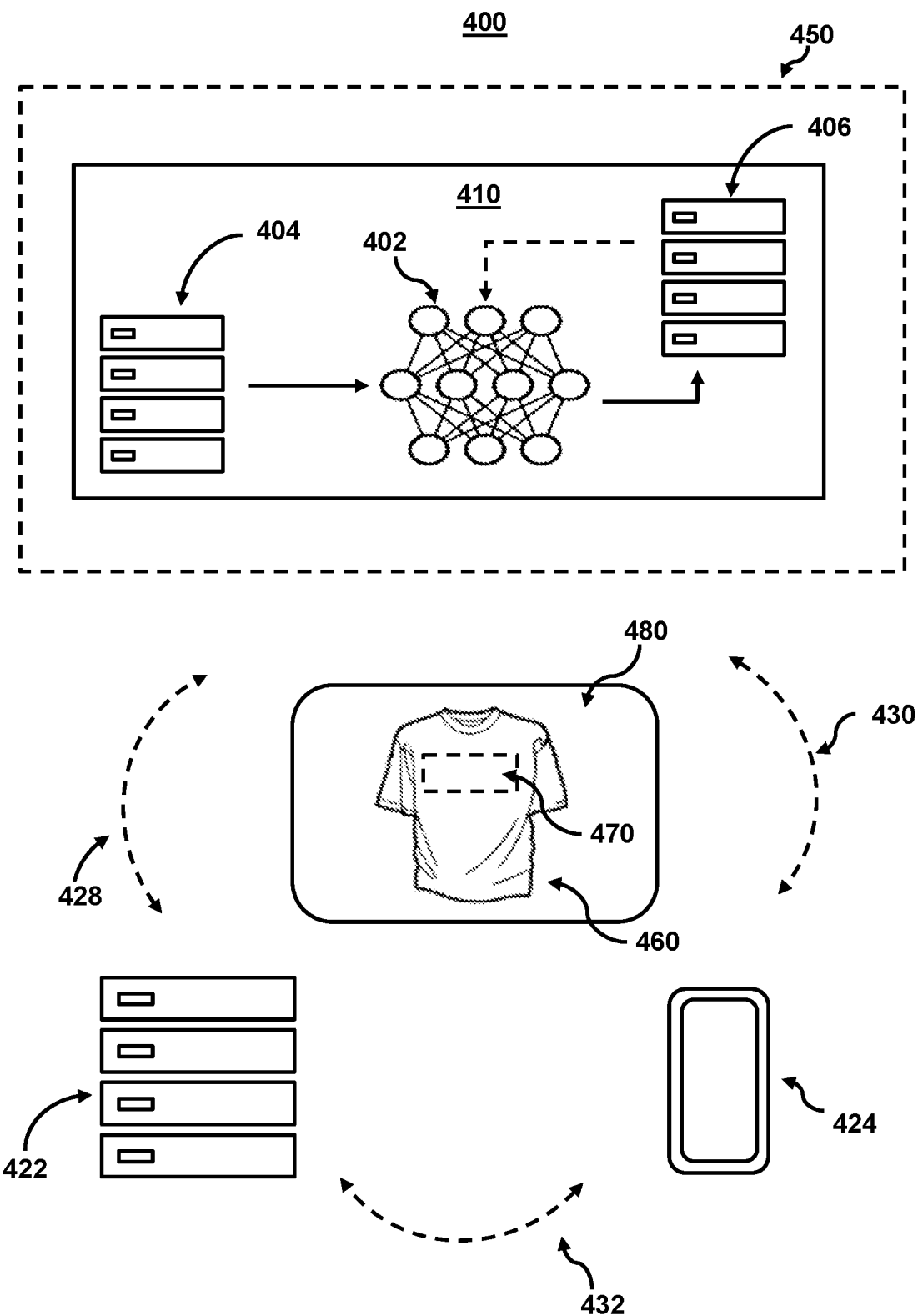
FIG. 4 shows a system for dynamic content placement, in accordance with one or more embodiments.

FIG. 4 shows a system for dynamic content placement, in accordance with one or more embodiments. As shown in FIG. 4, system 400 may include server 422 and user terminal 424 (which in some embodiments may correspond to a personal computer). The components of system 400 may work in concert to place media asset 470 on object 460 in media asset 480.

While shown as a server and smartphone, respectively, in FIG. 4, it should be noted that server 422 and user terminal 424 may be any computing device, including, but not limited to, a laptop computer, a tablet computer, a hand-held computer, and other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users may, for instance, utilize one or more devices to interact with one another, one or more servers, or other components of system 400. It should be noted that, while one or more operations are described herein as being performed by particular components of system 400, those operations may, in some embodiments, be performed by other components of system 400. As an example, while one or more operations are described herein as being performed by components of server 422, those operations may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of server 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both server 422 and user terminal 424 include a display upon which to display data (e.g., as shown in FIG. 1).

Additionally, as server 422 and user terminal 424 are shown as touchscreen smartphones, these displays also act as user input interfaces. It should be noted that in some embodiments, the devices may have neither a user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to recommending content. It should be noted that, although some embodiments are described herein specifically with respect to artificial intelligence models, other predictive, statistically based analytical models may be used in lieu of or in addition to artificial intelligence models in other embodiments.

Each of these devices may also include memory in the form of electronic storage. The electronic storage may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the internet, a mobile phone network, a mobile voice or data network (e.g., a 5G or LTE network), a cable network, a public switched telephone network, or other types of communication networks or combinations of communication networks. Communication paths 428, 430, and 432 may separately or together include one or more communications paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database (tabular or graph) configured to store user data for the system. For example, the database may include data that the system has collected about the media assets, metadata, and/or correlations between them through prior interactions, both actively and passively. Alternatively, or additionally, the system may act as a clearinghouse for multiple sources of information about the data, available resources, and/or other content. For example, one or more of cloud components 410 may include a microservice and/or components thereof. In some embodiments, the microservice may be a collection of applications that each collect one or more of the plurality of variables.

Cloud components 410 may include model 402, which may be an artificial intelligence model and/or another artificial intelligence model (as described in FIG. 3). Model 402 may take inputs 404 and provide outputs 406. The inputs may include multiple datasets such as a training dataset and a test dataset. Each of the plurality of datasets (e.g., inputs 404) may include data subsets related to user data, original content, and/or alternative content. In some embodiments, outputs 406 may be fed back to model 402 as inputs to train model 402. For example, the system may receive a first labeled feature input, wherein the first labeled feature input is labeled with a known description (e.g., identifying content, identifying media assets, placing media assets on objects, modifying media assets to mimic objects in media assets, determining confidences, etc.) for the first labeled feature input (e.g., a feature input based on labeled training data). The system may then train the first artificial intelligence model to classify the first labeled feature input with the known description.

For example, the system may determine, using model 402, a first pixel count confidence that the first object meets the first pixel count requirement. The system may determine whether the first pixel count confidence corresponds to a threshold pixel count confidence. The system may, in response to determining that the first pixel count confidence corresponds to the threshold pixel count confidence, generate for display, in a user interface, the first media asset at the first object while the second media asset is presented.

In another embodiment, model 402 may update its configurations (e.g., weights, biases, or other parameters) based on the assessment of its prediction (e.g., outputs 406) and reference feedback information (e.g., user indication of accuracy, reference labels, or other information). In another embodiment, where model 402 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs. During training, an output layer of model 402 may correspond to a classification of model 402, and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., an incident).

For example, in some embodiments, the system may train an artificial intelligence model (e.g., an artificial neural network) to detect known descriptions based on a feature input. For example, the system may receive user data (e.g., comprising the variables and categories of variables described herein). The system may then generate a series of feature inputs based on the training data. For example, the system may generate a first feature input based on training data comprising user data corresponding to a first known error (or error likelihood). The system may label the first feature input with the first known description (e.g., labeling the data as corresponding to a classification of the description).

For example, in some embodiments, the system may train an artificial intelligence model (e.g., an artificial neural network) to determine a known metadata tag requirement, metadata field, content population function, etc. For example, the system may receive a criterion (e.g., content, media assets, objects, confidences, etc.). The system may then generate a series of feature inputs based on the criterion. For example, the system may generate a feature input based on training data comprising content corresponding to the model's interpretation of the user's description, and the system may determine a response (e.g., identifying content, identifying media assets, placing media assets on objects, modifying media assets to mimic objects in media assets, determining confidences, etc.).

The system may then train an artificial intelligence model to detect the first known content based on the labeled first feature input. The system may also train an artificial intelligence model (e.g., the same or different artificial intelligence model) to detect a second known content based on a labeled second feature input. For example, the training process may involve initializing some random values for each of the training matrices (e.g., of an artificial intelligence model) and attempting to predict the output of the input feature using the initial random values. Initially, the error of the model will be large, but comparing the model's prediction with the correct output (e.g., the known classification), the model is able to adjust the weights and biases values until the model provides the required predictions.

In some embodiments, the system may use one or more modeling approaches, including supervised modeling. Such supervised machine learning approaches such as linear or nonlinear regression, including neural networks and support vector machines, could be exploited to predict these processing requirements, should sufficient amounts of training data be available. In particular, processing requirement data can be sequential, time-dependent data, and this means that recurrent neural networks, convolutional neural networks (CNNs), and/or transformers, specifically, may be highly applicable in this setting for accurate price forecasting. In some embodiments, the system may use a model involving time series prediction and use Random Forest algorithms, Bayesian RNNs, LSTMs, transformer-based models, CNNs or other methods, or combinations of two or more of these and the following: Neural Ordinary Differential Equations (NODEs), stiff and non-stiff universal ordinary differential equations (universal ODEs), universal stochastic differential equations (universal SDEs), and/or universal delay differential equations (universal DDEs).

The system may receive user data via a microservice and/or other means. For example, the microservice may comprise a collection of applications that each collect one or more of a plurality of variables. For example, the system may extract user data from an API layer operating on a user device or at a service provider (e.g., via a cloud service accessed by a user). Additionally or alternatively, the system may receive user data files (e.g., as a download and/or streaming in real time or near real time).

System 400 also includes API layer 450. For example, in some embodiments, the system may be implemented as one or more APIs and/or an API layer. In some embodiments, API layer 450 may be implemented on server 422 or user terminal 424. Alternatively or additionally, API layer 450 may reside on one or more of cloud components 410. API layer 450 (which may be a REST or Web services API layer) may provide a decoupled interface to data and/or functionality of one or more applications. API layer 450 may provide a common, language-agnostic way of interacting with an application. Web services APIs offer a well-defined contract called WSDL that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 450 may use various architectural arrangements. For example, system 400 may be partially based on API layer 450, such that there is strong adoption of SOAP and RESTful Web services, using resources like Service Repository and Developer Portal but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside. In this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use a developer portal. API layer 450 may use strong security constraints applying WAF and DDOS protection, and API layer 450 may use RESTful APIs as standard for external integration.

Figure 5:
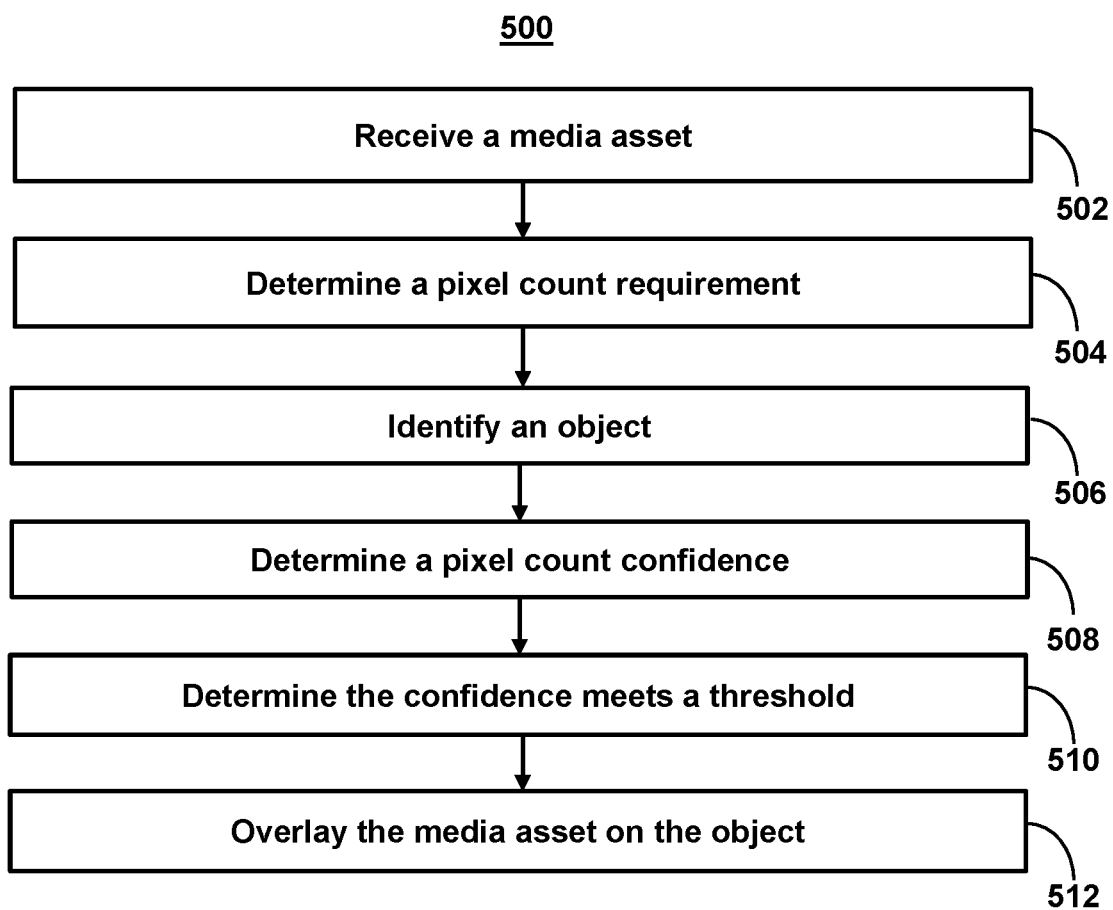
FIG. 5 shows a flowchart for steps involved in dynamic content placement based on pixel count confidences in pre-existing content, in accordance with one or more embodiments.

FIG. 5 shows a flowchart for steps involved in dynamic content placement based on pixel count confidences in pre-existing content, in accordance with one or more embodiments. For example, the system may use process 500 (e.g., as implemented on one or more system components described above) in order to facilitate dynamic content placement.

At step 502, process 500 (e.g., using one or more components described above) receives a media asset. For example, the system may receive a first media asset. In some embodiments, the system may receive a first media asset that corresponds to an advertisement and/or other content for overlaying on an object in another media asset. For example, the system may receive an advertisement for overlaying on an object (e.g., a shirt worn by a character in a movie) in a media asset.

In some embodiments, the system may perform real-time OCRing in response to detecting that a media asset is being displayed. For example, real-time OCR (Optical Character Recognition) is the process of extracting text, objects, and/or other information from images, documents, and/or other media assets in real time. In such cases, the system may acquire (e.g., via capturing images from a camera, scanning documents, and/or loading image files) an image, video frame, and/or other portion of a media asset that contains a target object to recognize. Once the image, text, etc., is acquired, the system may preprocess (e.g., via image resizing, noise removal, contrast adjustment, and/or image normalization) the content to enhance the quality and improve the OCR accuracy. The system may then locate the regions of the image, document, and/or media asset that contains the target object (e.g., using edge detection, connected component analysis, and/or deep learning-based object detection algorithms). After locating the regions, the system may perform text segmentation, which involves dividing the text into individual characters or groups of characters (e.g., words or lines). The system may then process the segmented characters and/or objects through a character recognition algorithm to identify the corresponding letters, numbers, or symbols. Once the characters and/or objects are recognized, the system may combine detected characters and/or objects to form words, lines of text, groups of objects, and/or combine multiple detected objects to form the target object. The system may then perform post-processing to refine the results and output the detected target object. For example, when receiving the first media asset, the system may determine the second media asset is currently being displayed in the user interface. In response to determining the second media asset is currently being displayed in the user interface, the system may request the first media asset.

At step 504, process 500 (e.g., using one or more components described above) determines a pixel count requirement. For example, the system may determine a first pixel count requirement for the first media asset, wherein the first pixel count requirement indicates a required number of pixels appearing in objects for incorporating the first media asset. In some embodiments, the system may determine a number of pixels, a size indicated by the number of pixels, a proportion of a frame corresponding to the number of pixels, and/or a length of time that the pixels are displayed that is required for placing the first media asset into another media asset. For example, the system may determine whether or not the number of pixels corresponding to the object is large enough (or displayed long enough) to house the advertisement. For example, when receiving the first media asset, the system may determine a first type of the first media asset. The system may monitor content displayed in the user interface for the first type.

In some embodiments, the system may determine a number of pixels, a size indicated by the number of pixels, a proportion of a frame corresponding to the number of pixels, and/or a length of time that the pixels are displayed that is required for placing the first media asset into another media asset. For example, the system may determine whether or not the number of pixels corresponding to the object is large enough (or displayed long enough) to house the advertisement. The system may determine this based on determining a size of the first media asset, including whether the first media asset has a required number of pixels, size indicated by the number of pixels, proportion of the frame, and/or a length of time of display. For example, the media asset to be placed (e.g., an advertisement) may have one or more thresholds for display that must be met in order to place the media asset. In some embodiments, the system may determine these thresholds based on metadata received with and/or metadata otherwise associated with the media asset. For example, when determining the first pixel count requirement for the first media asset, the system may receive metadata for the first media asset and determine the first pixel count requirement based on the metadata.

At step 506, process 500 (e.g., using one or more components described above) identifies an object. For example, the system may identify a first object in a second media asset. In some embodiments, the system may use object recognition, including boundary and/or edge detection to identify objects in a media asset. Additionally or alternatively, the system may further determine a type of the object (e.g., a category of clothing, a car, etc.), the system may then determine whether the type of object also corresponds to the first media asset. For example, the system may determine that an advertisement featuring a logo (e.g., that is normally seen on a shirt) needs to be displayed on a type of object (e.g., a shirt on a character in the media asset).

In some embodiments (e.g., where target objects include text), the system may refine the localization of individual text elements, such as words or lines to separate text from the background and surrounding objects. Additionally or alternatively, the system may use additional localization in instances where a characteristic (e.g., a pixel characteristic) of an object (e.g., a color, brightness, etc.) corresponds to a background of the media asset and/or other objects in the media asset. For example, the system may determine that a shirt of a character (e.g., a target object) is white, and the background of the media asset is also white. The system may then perform additional localization to distinguish the target object from the background.

For example, the system may localize the first object by processing content to more accurately identify the regions in the content (e.g., an image or document) that contains the object. Before performing the localization, the system may apply preprocessing techniques (e.g., image resizing, noise reduction, contrast adjustment, and/or image normalization) to enhance the image quality and improve object visibility. The system may then use an edge detection algorithm to identify sharp transitions in pixel intensity (or other characteristics), which helps locate text edges. In some embodiments, the system may iterate through various characteristics to extract edges and/or other boundaries between the target object and other content (e.g., a background or other objects in the image). In some embodiments, the system may use connected component analysis to group together adjacent pixels with similar characteristics (e.g., color or intensity) to form object regions. By analyzing the properties and geometric characteristics of connected components, potential object regions for the target object may be identified. Additionally or alternatively, the system may use Stroke Width Transform (SWT) analysis to analyze the variations in stroke widths within a media asset. Additionally or alternatively, the system may use CNNs, and other deep learning architectures can be trained to directly detect object regions in media assets. These models learn to classify regions as text, non-text, and/or regions with particular characteristics often using annotated training data. Once potential object regions are detected, the system may filter the media asset to eliminate false positives and improve the accuracy of localization. This can involve analyzing the characteristics of the detected regions, such as aspect ratio, size, or text-like properties, to determine the likelihood that they contain actual text and/or the target object.

For example, when identifying the first object in the second media asset, the system may determine a first characteristic of the first object. The system may determine a second characteristic of a second object in the second media asset. The system may determine whether the first characteristic corresponds to the second characteristic. The system may, in response to determining that the first characteristic corresponds to the second characteristic, localize the first object in the second media asset.

At step 508, process 500 (e.g., using one or more components described above) determines a pixel count confidence. For example, the system may determine, using an artificial intelligence model, a first pixel count confidence that the first object meets the first pixel count requirement. In some embodiments, the system may use an artificial intelligence model to estimate a confidence at which a number of pixels in the object corresponds to the pixel count requirement. For example, as the system is generating and placing content in pre-existing content, the system may need to estimate the likelihood that a given object is going to remain displayed and/or be large enough to adequately display an advertisement.

For example, the system may determine whether or not the object is likely to be displayed for a sufficient amount of time (e.g., in a threshold number of frames in the media asset), is going to be displayed prominently in the media asset (e.g., corresponds to a high proportion of pixels in a given frame), and/or will display on an object that does not change orientation (e.g., via a character moving, twisting, etc.) to an extent that the advertisement is obscured.

In some embodiments, the system may base a pixel count confidence on an estimation of a number of pixels that have a required pixel characteristic. For example, the system may estimate a number of pixels that correspond to a particular object. Additionally or alternatively, the system may determine a number of pixels that have a specified property or attribute (e.g., a pixel characteristic) or combination thereof. The pixel characteristic may comprise a color. For example, pixels may have color information associated with them. The color can be represented using different color models such as RGB (Red, Green, Blue) or CMYK (Cyan, Magenta, Yellow, Black). Additionally or alternatively, the pixel characteristic may comprise an intensity. For example, pixels may be represented by a single intensity value, typically in grayscale images. The intensity value may represent the brightness or luminance of the pixel. Additionally or alternatively, the pixel characteristic may comprise a spatial location. For example, pixels may have a specific position within the media asset. The spatial location of a pixel may be defined by its row and column coordinates (e.g., in a two-dimensional content), its time stamp, its orientation, its depth, and/or other coordinate. Additionally or alternatively, the pixel characteristic may comprise a size. For example, pixels may have a physical size, which is usually determined by the display, proportion of the display, resolution of the display, and/or imaging device. For example, pixels may be represented as square units, but their actual size can vary depending on the resolution and display density. Additionally or alternatively, the pixel characteristic may comprise a size. For example, pixels may have a bit depth, which defines the number of bits used to represent the color or intensity of a pixel. Additionally or alternatively, the pixel characteristic may comprise a transparency. For example, pixels may use an alpha channel, representing the level of transparency or opacity. Additionally or alternatively, the pixel characteristic may comprise a range of values. For example, pixels may have a value range of a pixel that depends on its representation. In grayscale images, the intensity value typically ranges from 0 (black) to 255 (white) for 8-bit images. In color images, each color channel typically has the same value range. For example, when determining the first pixel count confidence that the first object meets the first pixel count requirement, the system may determine a required pixel characteristic. The system may estimate whether the required number of pixels appearing in objects for incorporating the first media asset corresponds to the required pixel characteristic.

In some embodiments, the first pixel count confidence may be based on a number of pixels in a plurality of frames of a media asset. For example, the system may detect (or estimate) the number of pixels in multiple (e.g., consecutive or non-consecutive) frames. The system may then determine the pixel count confidence by averaging, summing, and/or otherwise combing the respective pixel counts. For example, when determining the first pixel count confidence that the first object meets the first pixel count requirement, the system may estimate a first frame pixel count in a first frame of the second media asset. The system may estimate a second frame pixel count in a second frame of the second media asset. The system may determine the first pixel count confidence by aggregating the first frame pixel count and the second frame pixel count.

In some embodiments, the first pixel count confidence may be based on a statistical analysis that the first object meets the first pixel count requirement. For example, the system may determine the sample size. For example, the system may determine how many observations or data points (e.g., frames in a media asset) are needed to collect to estimate the pixel count confidence. The system may determine that the sample size depends on various factors, including the desired level of precision and confidence. The system may then determine a required confidence level. For example, the system may determine whether the confidence level corresponds to 90%, 95%, and 99%. The system may then identify an appropriate statistical test. For example, the system may use hypothesis testing, confidence interval estimation, and/or regression analysis. The system may then collect data by obtaining a sample from a media asset (e.g., determining a number of pixels in one or more frames of the media asset). The system may then estimate a total pixel count in the second media asset. To do so, the system may calculate means, proportions, and/or standard deviations, and/or perform a regression analysis. For example, the system may determine the first pixel count confidence that the first object meets the first pixel count requirement by obtaining a first sample of the second media asset. The system may determine a pixel count in the first sample. The system may estimate a total pixel count in the second media asset based on the pixel count.

At step 510, process 500 (e.g., using one or more components described above) determines the confidence meets a threshold. For example, the system may determine whether the first pixel count confidence corresponds to a threshold pixel count confidence. In some embodiments, the system may receive a threshold pixel content confidence that indicates a required likelihood that an object will comprise a certain number of pixels.

In some embodiments, the system may compare the pixel count confidence to a threshold confidence to determine whether to place the first media asset in the second media asset. The system may then determine the pixel count confidence. For example, the system may determine whether the pixel count confidence corresponds to a given confidence level, which may involve examining the confidence interval or p-value obtained from the statistical analysis. For example, the confidence interval may provide a range of values within which the true population parameter is likely to fall, while a p-value indicates the likelihood of obtaining the observed results if the null hypothesis is true. For example, the media asset to be placed (e.g., an advertisement) may have one or more thresholds for display that must be met in order to place the media asset. In some embodiments, the system may determine these thresholds based on metadata received with and/or metadata otherwise associated with the media asset. For example, when determining whether the first pixel count confidence corresponds to the threshold pixel count confidence, the system may receive metadata for the first media asset. The system may then determine the threshold pixel count confidence based on the metadata.

At step 512, process 500 (e.g., using one or more components described above) overlays the media asset on the object. For example, the system may, in response to determining that the first pixel count confidence corresponds to the threshold pixel count confidence, generate for display, in a user interface, the first media asset at the first object while the second media asset is presented. In some embodiments, the system may generate for display the first media asset (e.g., comprising an advertisement) in an object of a second media asset.

In some embodiments, the system may generate for display the first media asset (e.g., comprising an advertisement) in an object of a second media asset. For example, the system may generate the first media asset over several frames (either consecutive or non-consecutive). To do so, the system may determine a location of an object in each frame of the media asset. The system may then overlay (or replace) the object with the first media asset at each respective location in each respective frame. For example, to overlay a media asset on the object, the system may edit the object (and/or the second media asset). In some embodiments, the system may create a new layer in the second media asset. Layers are used to stack different elements in an image, video, and/or other content. The system may create a new layer that will contain the first media asset and overlay this new layer over a layer comprising the second media asset and/or object. In some embodiments, the system may position, resize, and/or modify another property of the first media asset and/or object. For example, when generating for display the first media asset at the first object while the second media asset is presented, the system may determine a first location of the first object in a first frame of the second media asset. The system may generate for display the first media asset at the first location in the first frame of the second media asset. The system may determine a second location of the first object in a second frame of the second media asset. The system may generate for display the first media asset at the second location in the second frame of the second media asset.

In some embodiments, the system may generate for display the first media asset (e.g., comprising an advertisement) with the same orientation as the object in the second media asset. For example, the object may change orientations in the second media asset as the second media asset is displayed. In order to maintain continuity, the system may adjust the orientation of the first media asset in response. For example, when generating for display the first media asset at the first object while the second media asset is presented, the system may determine a first orientation of the first object in a first frame of the second media asset. The system may generate for display the first media asset with the first orientation in the first frame of the second media asset. The system may determine a second orientation of the first object in a second frame of the second media asset. The system may generate for display the first media asset with the second orientation in the second frame of the second media asset.

In some embodiments, the system may generate for display a selectable first media asset. For example, the system may generate a hyperlink that may be selected by a user while the first media asset is displayed. For example, when generating for display the first media asset at the first object while the second media asset is presented, the system may determine a first link for the first media asset. The system may embed the first link in the first media asset.

In some embodiments, the system may generate for display a selectable first media asset. For example, the system may generate a hyperlink that may be selected by a user while the first media asset is displayed. For example, the system may generate for display the first media asset at the first object while the second media asset is presented, and the system may receive, at the user interface, the second media asset. The system may render the second media asset at the user interface, wherein the first object is identified in the second media asset after the second media asset is rendered.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for dynamic content placement based on pixel count confidences in pre-existing content.
2. The method of the preceding embodiment, further comprising: receiving a first media asset; determining a first pixel count requirement for the first media asset, wherein the first pixel count requirement indicates a required number of pixels appearing in objects for incorporating the first media asset; identifying a first object in a second media asset; determining, using an artificial intelligence model, a first pixel count confidence that the first object meets the first pixel count requirement; determining whether the first pixel count confidence corresponds to a threshold pixel count confidence; and in response to determining that the first pixel count confidence corresponds to the threshold pixel count confidence, generating for display, in a user interface, the first media asset at the first object while the second media asset is presented.
3. The method of any one of the preceding embodiments, wherein receiving the first media asset further comprises: determining the second media asset is currently being displayed in the user interface; and in response to determining the second media asset is currently being displayed in the user interface, requesting the first media asset.
4. The method of any one of the preceding embodiments, wherein receiving the first media asset further comprises: determining a first type of the first media asset; and monitoring content displayed in the user interface for the first type.
5. The method of any one of the preceding embodiments, wherein determining the first pixel count requirement for the first media asset further comprises: receiving metadata for the first media asset; and determining the first pixel count requirement based on the metadata.
6. The method of any one of the preceding embodiments, wherein identifying the first object in the second media asset comprises: determining a first characteristic of the first object; determining a second characteristic of a second object in the second media asset; determining whether the first characteristic corresponds to the second characteristic; and in response to determining that the first characteristic corresponds to the second characteristic, localizing the first object in the second media asset.
7. The method of any one of the preceding embodiments, wherein determining the first pixel count confidence that the first object meets the first pixel count requirement further comprises: determining a required pixel characteristic; and estimating whether the required number of pixels appearing in objects for incorporating the first media asset corresponds to the required pixel characteristic.

8. The method of any one of the preceding embodiments, wherein determining the first pixel count confidence that the first object meets the first pixel count requirement further comprises: estimating a first frame pixel count in a first frame of the second media asset; estimating a second frame pixel count in a second frame of the second media asset; and determining the first pixel count confidence by aggregating the first frame pixel count and the second frame pixel count.

9. The method of any one of the preceding embodiments, wherein determining the first pixel count confidence that the first object meets the first pixel count requirement further comprises: obtaining a first sample of the second media asset; determining a pixel count in the first sample; and estimating a total pixel count in the second media asset based on the pixel count.

10. The method of any one of the preceding embodiments, wherein determining whether the first pixel count confidence corresponds to the threshold pixel count confidence further comprises: receiving metadata for the first media asset; and determining the threshold pixel count confidence based on the metadata.

11. The method of any one of the preceding embodiments, wherein generating for display the first media asset at the first object while the second media asset is presented further comprises: determining a first location of the first object in a first frame of the second media asset; generating for display the first media asset at the first location in the first frame of the second media asset; determining a second location of the first object in a second frame of the second media asset; and generating for display the first media asset at the second location in the second frame of the second media asset.

12. The method of any one of the preceding embodiments, wherein generating for display the first media asset at the first object while the second media asset is presented further comprises: determining a first orientation of the first object in a first frame of the second media asset; generating for display the first media asset with the first orientation in the first frame of the second media asset; determining a second orientation of the first object in a second frame of the second media asset; and generating for display the first media asset with the second orientation in the second frame of the second media asset.

13. The method of any one of the preceding embodiments, wherein generating for display the first media asset at the first object while the second media asset is presented further comprises: determining a first link for the first media asset; and embedding the first link in the first media asset.

14. The method of any one of the preceding embodiments, wherein generating for display the first media asset at the first object while the second media asset is presented further comprises: receiving, at the user interface, the second media asset; and rendering the second media asset at the user interface, wherein the first object is identified in the second media asset after the second media asset is rendered.

15. One or more non-transitory, computer-readable media storing instructions that, when executed by a data processing apparatus, cause the data processing apparatus to perform operations comprising those of any of embodiments 1-14.

16. A system comprising one or more processors; and memory storing instructions that, when executed by the processors, cause the processors to effectuate operations comprising those of any of embodiments 1-14.

17. A system comprising means for performing any of embodiments 1-14.

We claim:

1. A system for dynamic content placement based on pixel count confidences in pre-existing content, the system comprising:
    one or more processors; and
    one or more non-transitory, computer-readable mediums comprising instructions that when executed by the one or more processors cause operations comprising:
        receiving a first media asset;
        determining a first pixel count requirement for the first media asset, wherein the first pixel count requirement indicates a required number of pixels appearing in objects for incorporating the first media asset and a required amount of time that the objects remain displayed;
        receiving, at a user interface of a first device, a second media asset;
        rendering, at the user interface, the second media asset;
        after rendering the second media asset:
            identifying a first object in the second media asset;
            determining, using an artificial intelligence model, a first pixel count confidence that the first object meets the first pixel count requirement while the second media asset is presented;
            determining whether the first pixel count confidence corresponds to a threshold pixel count confidence; and
            in response to determining that the first pixel count confidence corresponds to the threshold pixel count confidence, generating for display, in the user interface, the first media asset at the first object while the second media asset is presented.

2. A method for dynamic content placement based on pixel count confidences in pre-existing content, the method comprising:
    receiving a first media asset;
    determining a first pixel count requirement for the first media asset, wherein the first pixel count requirement indicates a required number of pixels appearing in objects for incorporating the first media asset and a required amount of time that the objects remain displayed;
    identifying a first object in a second media asset;
    determining, using an artificial intelligence model, a first pixel count confidence that the first object meets the first pixel count requirement while the second media asset is presented;
    determining whether the first pixel count confidence corresponds to a threshold pixel count confidence; and
    in response to determining that the first pixel count confidence corresponds to the threshold pixel count confidence, generating for display, in a user interface, the first media asset at the first object while the second media asset is presented.

3. The method of claim 2, wherein receiving the first media asset further comprises:
    determining the second media asset is currently being displayed in the user interface; and in response to determining the second media asset is currently being displayed in the user interface, requesting the first media asset.

4. The method of claim 2, wherein receiving the first media asset further comprises:
   determining a first type of the first media asset; and
   monitoring content displayed in the user interface for the first type.

5. The method of claim 2, wherein determining the first pixel count requirement for the first media asset further comprises:
   receiving metadata for the first media asset; and
   determining the first pixel count requirement based on the metadata.

6. The method of claim 2, wherein identifying the first object in the second media asset comprises:
   determining a first characteristic of the first object;
   determining a second characteristic of a second object in the second media asset;
   determining whether the first characteristic corresponds to the second characteristic; and
   in response to determining that the first characteristic corresponds to the second characteristic, localizing the first object in the second media asset.

7. The method of claim 2, wherein determining the first pixel count confidence that the first object meets the first pixel count requirement further comprises:
   determining a required pixel characteristic; and
   estimating whether the required number of pixels appearing in objects for incorporating the first media asset corresponds to the required pixel characteristic.

8. The method of claim 2, wherein determining the first pixel count confidence that the first object meets the first pixel count requirement further comprises:
   estimating a first frame pixel count in a first frame of the second media asset;
   estimating a second frame pixel count in a second frame of the second media asset; and
   determining the first pixel count confidence by aggregating the first frame pixel count and the second frame pixel count.

9. The method of claim 2, wherein determining the first pixel count confidence that the first object meets the first pixel count requirement further comprises:
   obtaining a first sample of the second media asset;
   determining a pixel count in the first sample; and
   estimating a total pixel count in the second media asset based on the pixel count.

10. The method of claim 2, wherein determining whether the first pixel count confidence corresponds to the threshold pixel count confidence further comprises:
    receiving metadata for the first media asset; and
    determining the threshold pixel count confidence based on the metadata.

11. The method of claim 2, wherein generating for display the first media asset at the first object while the second media asset is presented further comprises:
    determining a first location of the first object in a first frame of the second media asset;
    generating for display the first media asset at the first location in the first frame of the second media asset;
    determining a second location of the first object in a second frame of the second media asset; and
    generating for display the first media asset at the second location in the second frame of the second media asset.

12. The method of claim 2, wherein generating for display the first media asset at the first object while the second media asset is presented further comprises:
    determining a first orientation of the first object in a first frame of the second media asset;
    generating for display the first media asset with the first orientation in the first frame of the second media asset;
    determining a second orientation of the first object in a second frame of the second media asset; and
    generating for display the first media asset with the second orientation in the second frame of the second media asset.

13. The method of claim 2, wherein generating for display the first media asset at the first object while the second media asset is presented further comprises:
    determining a first link for the first media asset; and
    embedding the first link in the first media asset.

14. The method of claim 2, wherein generating for display the first media asset at the first object while the second media asset is presented further comprises:
    receiving at the user interface the second media asset; and
    rendering the second media asset at the user interface, wherein the first object is identified in the second media asset after the second media asset is rendered.

15. One or more non-transitory, computer-readable mediums comprising instructions that when executed by one or more processors cause operations comprising:
    receiving a first media asset;
    determining a first pixel count requirement for the first media asset, wherein the first pixel count requirement indicates a required number of pixels appearing in objects for incorporating the first media asset and a required amount of time that the objects remain displayed;
    identifying a first object in a second media asset;
    determining a first pixel count confidence that the first object meets the first pixel count requirement while the second media asset is presented;
    determining whether the first pixel count confidence corresponds to a threshold pixel count confidence; and
    in response to determining that the first pixel count confidence corresponds to the threshold pixel count confidence, generating for display, in a user interface, the first media asset at the first object while the second media asset is presented.

16. The one or more non-transitory, computer-readable mediums of claim 15, wherein receiving the first media asset further comprises:
    determining the second media asset is currently being displayed in the user interface; and
    in response to determining the second media asset is currently being displayed in the user interface, requesting the first media asset.

17. The one or more non-transitory, computer-readable mediums of claim 15, wherein receiving the first media asset further comprises:
    determining a first type of the first media asset; and
    monitoring content displayed in the user interface for the first type.

18. The one or more non-transitory, computer-readable mediums of claim 15, wherein determining the first pixel count requirement for the first media asset further comprises:
    receiving metadata for the first media asset; and
    determining the first pixel count requirement based on the metadata.

19. The one or more non-transitory, computer-readable mediums of claim 15, wherein identifying the first object in the second media asset comprises:
- determining a first characteristic of the first object;
- determining a second characteristic of a second object in the second media asset;
- determining whether the first characteristic corresponds to the second characteristic; and
- in response to determining that the first characteristic corresponds to the second characteristic, localizing the first object in the second media asset.

20. The one or more non-transitory, computer-readable mediums of claim 15, wherein determining the first pixel count confidence that the first object meets the first pixel count requirement further comprises:
- determining a required pixel characteristic; and
- estimating whether the required number of pixels appearing in objects for incorporating the first media asset corresponds to the required pixel characteristic.

* * * * *